(12) United States Patent
Boal et al.

(10) Patent No.: US 10,829,859 B2
(45) Date of Patent: Nov. 10, 2020

(54) ELECTROLYTIC PRODUCTION OF HALOGEN BASED DISINFECTANT SOLUTIONS FROM HALIDE CONTAINING WATERS AND USES THEREOF

(71) Applicant: De Nora Holdings US, Inc., Concord, OH (US)

(72) Inventors: Andrew Kiskadden Boal, Albuquerque, NM (US); Justin Sanchez, Albuquerque, NM (US); Matthew Ronald Santillanes, Albuquerque, NM (US)

(73) Assignee: De Nora Holdings US, Inc., Concord, OH (US)

( * ) Notice: Subject to any disclaimer, the term of this patent is extended or adjusted under 35 U.S.C. 154(b) by 64 days.

(21) Appl. No.: 15/765,765

(22) PCT Filed: Oct. 6, 2016

(86) PCT No.: PCT/GB2016/053106
§ 371 (c)(1),
(2) Date: Apr. 4, 2018

(87) PCT Pub. No.: WO2017/060703
PCT Pub. Date: Apr. 13, 2017

(65) Prior Publication Data
US 2018/0282882 A1   Oct. 4, 2018

Related U.S. Application Data

(60) Provisional application No. 62/237,959, filed on Oct. 6, 2015, provisional application No. 62/348,106, filed on Jun. 9, 2016.

(51) Int. Cl.
*C25B 1/26*      (2006.01)
*C25B 1/24*      (2006.01)
(Continued)

(52) U.S. Cl.
CPC ............ *C25B 1/26* (2013.01); *A01N 59/00* (2013.01); *C25B 1/24* (2013.01); *C25B 15/02* (2013.01); *Y02E 60/36* (2013.01)

(58) Field of Classification Search
CPC .. A01N 59/00; C25B 1/24; C25B 1/26; C02F 1/4674
See application file for complete search history.

(56) References Cited

U.S. PATENT DOCUMENTS 3,776,825 A * 12/1973 Vit ........................... A61K 8/44
                                                              205/434
2002/0139689 A1* 10/2002 Zolotarsky ............... C25B 1/24
                                                              205/342
(Continued)

FOREIGN PATENT DOCUMENTS

WO    WO2016/019055 A1    2/2016

OTHER PUBLICATIONS

B. Alexander et al., The Solubility of Amorphous Silica in Water, Journal of Physical Chemistry, 1954, 58 (6) pp. 453-455.
(Continued)

*Primary Examiner* — Salil Jain
(74) *Attorney, Agent, or Firm* — BakerHostetler

(57) ABSTRACT

Disclosed in the present invention are methods and apparatuses for the electrochemical conversion of halide ion containing brines into halogen based disinfection solutions while the impact of scale formation on electrochemical system operations. This is accomplished by controllably modifying the brine with one or more of halide ions, a halogen stabilization compound, an acid component, or a buffering component. These chemical modifications of the brine allow for the production of stabilized 10 halogen solutions, which can then be used as disinfectants. The present invention is especially useful in the production of halogen-based biocides from flowback or produced waters (Continued)

resulting from oil and gas production, but can be applied to any halide ion containing water stream, including reject water from reverse osmosis filtration processes or ocean water, that contains ammonia.

2 Claims, 5 Drawing Sheets

(51) Int. Cl.
*A01N 59/00* (2006.01)
*C25B 15/02* (2006.01)

(56) References Cited

U.S. PATENT DOCUMENTS

| | | | |
|---|---|---|---|
| 2005/0211643 A1* | 9/2005 | Phillips | A22C 21/0061 |
| | | | 210/753 |
| 2007/0045199 A1 | 3/2007 | Mayer et al. | |
| 2007/0049642 A1* | 3/2007 | Singleton | C01B 21/091 |
| | | | 514/612 |
| 2007/0098817 A1* | 5/2007 | Wetegrove | A01N 59/00 |
| | | | 424/661 |
| 2008/0181815 A1* | 7/2008 | Cheng | C02F 1/50 |
| | | | 422/37 |
| 2009/0008268 A1* | 1/2009 | Salathe | A01N 59/08 |
| | | | 205/746 |
| 2009/0211918 A1* | 8/2009 | Hardee | C02F 1/4674 |
| | | | 205/556 |
| 2010/0240535 A1* | 9/2010 | Yoneda | A01N 59/00 |
| | | | 504/151 |
| 2011/0159117 A1 | 6/2011 | Mayer et al. | |
| 2012/0121731 A1 | 5/2012 | Peters et al. | |
| 2012/0228149 A1 | 9/2012 | Boal et al. | |
| 2012/0328504 A1* | 12/2012 | Debiemme-Chouvy | |
| | | | C25B 1/00 |
| | | | 423/413 |
| 2013/0026097 A1* | 1/2013 | Hirao | A01N 41/08 |
| | | | 210/639 |
| 2014/0018432 A1* | 1/2014 | Sharoyan | C07C 273/1863 |
| | | | 514/588 |
| 2014/0322362 A1* | 10/2014 | Frim | A01N 59/00 |
| | | | 424/723 |
| 2014/0328945 A1* | 11/2014 | Adams | A01N 59/00 |
| | | | 424/661 |
| 2016/0330969 A1* | 11/2016 | O'Connell, Jr. | A01N 59/00 |

OTHER PUBLICATIONS

PCT/GB2016/053106 International Search Report dated Nov. 24, 2016.
PCT/GB2016/053106 Written Opinion dated Nov. 24, 2016.

* cited by examiner

ELECTROLYTIC PRODUCTION OF HALOGEN BASED DISINFECTANT SOLUTIONS FROM HALIDE CONTAINING WATERS AND USES THEREOF

CROSS-REFERENCE TO RELATED APPLICATIONS

This application is the National Stage Application of International Patent Application No. PCT/GB2016/053106, filed Oct. 6, 2016, which claims priority to and the benefit of U.S. Provisional Patent Application Ser. No. 62/237,959, entitled "Electrolytic Production of Halogen Based Disinfectant Solutions from Halide Containing Waters and Uses Thereof," filed on Oct. 6, 2015 and U.S. Provisional Patent Application Ser. No. 62/348,106, entitled "Electrolytic Production of Halogen Based Disinfectant Solutions from Halide Containing Waters and Uses Thereof," filed on Jun. 9, 2016, the entireties of all of which foregoing applications are incorporated herein by reference in their entireties for any and all purposes.

BACKGROUND OF THE INVENTION

Field of the Invention (Technical Field)

The present invention is related to the use of electrochemistry to produce stabilized aqueous halogen solutions through the electrolysis of brine solutions modified by the addition of halide ions, halogen stabilization compounds, and/or acids.

BACKGROUND ART

Note that the following discussion may refer to a number of publications and references. Discussion of such publications herein is given for more complete background of the scientific principles and is not to be construed as an admission that such publications are prior art for patentability determination purposes.

SUMMARY OF THE INVENTION (DISCLOSURE OF THE INVENTION)

The present invention is a method for producing a microbiocidally active solution, the method comprising adding a halogen stabilizing compound to a brine containing ammonia or an ammonium ion containing compound; and electrolyzing the brine in an electrolytic cell, thereby producing a microbiocidally active solution comprising a stabilized halogen compound. The microbiocidally active solution typically does not comprise trichloramine in a concentration above an odor detection threshold. The microbiocidally active solution preferably does not comprise dichloramine in a concentration above an odor detection threshold. The adding step preferably comprises adding a sufficient amount of the halogen stabilizing compound to the brine relative to the ammonia or ammonium ion containing compound to suppress formation of trichloramine and dichloramine. The halogen stabilizing compound is preferably selected from the group consisting of sulfamic acid (including derivatives of sulfamic acid), hydantoin, derivatives of hydantoin, succinimide, derivatives of succinimide, cyanuric acid, and organic amine compounds. The stabilized halogen compound is preferably selected from the group consisting of N-chlorosulfamic acid and N,N-dichlorosulfamic acid. The method optionally comprises adding halides to the brine to increase the halide concentration prior to the electrolyzing step. The method optionally comprises adding a buffering agent to the brine. The buffering agent is preferably selected from the group consisting of monobasic lithium phosphate ($LiH_2PO_4$), monobasic sodium phosphate ($NaH_2PO_4$), monobasic potassium phosphate ($KH_2PO_4$), dibasic lithium phosphate ($Li_2HPO_4$), dibasic sodium phosphate ($Na_2HPO_4$), dibasic potassium phosphate ($K_2HPO_4$), tribasic lithium phosphate ($Li_3PO_4$), tribasic sodium phosphate ($Na_3PO_4$), tribasic potassium phosphate ($K_3PO_4$), and combinations thereof.

An embodiment of the present invention comprises adding a sufficient amount of acid to the brine so that a pH of the brine prior to the electrolyzing step is less than 7, more preferably less than 5, and even more preferably less than 3. The acid preferably comprises the halogen stabilizing compound. The pH of the microbiocidally active solution is less than 7, and more preferably less than 3. The adding step preferably comprises adding a sufficient amount of the halogen stabilizing compound to the brine relative to amount of halide ions present in the brine such that the total halogen in the microbiocidally active solution comprises no more than approximately 20% free halogen. If the halogen comprises chlorine the method preferably further comprises minimizing the formation of chlorine gas produced during the electrolyzing step. The method preferably further comprises removing and/or preventing the formation of scale in downstream components. This can be accomplished because the microbiocidally active solution is acidic. Alternatively, the method comprises de-energizing the electrolytic cell, thereby stopping the electrolyzing step, and flowing brine through the de-energized electrolytic cell to the downstream components. The method preferably further comprises periodically reversing polarities of electrodes in the electrolytic cell.

In another embodiment of the present invention the pH of the brine is between 6 and 8 and a pH of the microbiocidally active solution is greater than 10. The pH of the microbiocidally active solution is preferably greater than 11. The microbiocidally active solution preferably comprises monochloramine. The microbial inactivation efficacy of the microbiocidally active solution is preferably 10-100 times greater than the microbial inactivation efficacy of a solution produced by electrolyzing the brine comprising the same amount of the halogen stabilizing compound but not comprising any ammonia or ammonium ion containing compound.

Objects, advantages and novel features, and further scope of applicability of the present invention will be set forth in part in the detailed description to follow, taken in conjunction with the accompanying drawings, and in part will become apparent to those skilled in the art upon examination of the following, or may be learned by practice of the invention. The objects and advantages of the invention may be realized and attained by means of the instrumentalities and combinations particularly pointed out in the appended claims.

BRIEF DESCRIPTION OF THE DRAWINGS

The accompanying drawings, which are incorporated into and form a part of the specification, illustrate several embodiments of the present invention and, together with the description, serve to explain the principles of the invention. The drawings are only for the purpose of illustrating certain embodiments of the invention and are not to be construed as limiting the invention. In the drawings.

DETAILED DESCRIPTION OF EMBODIMENTS OF THE INVENTION

Figure 1:
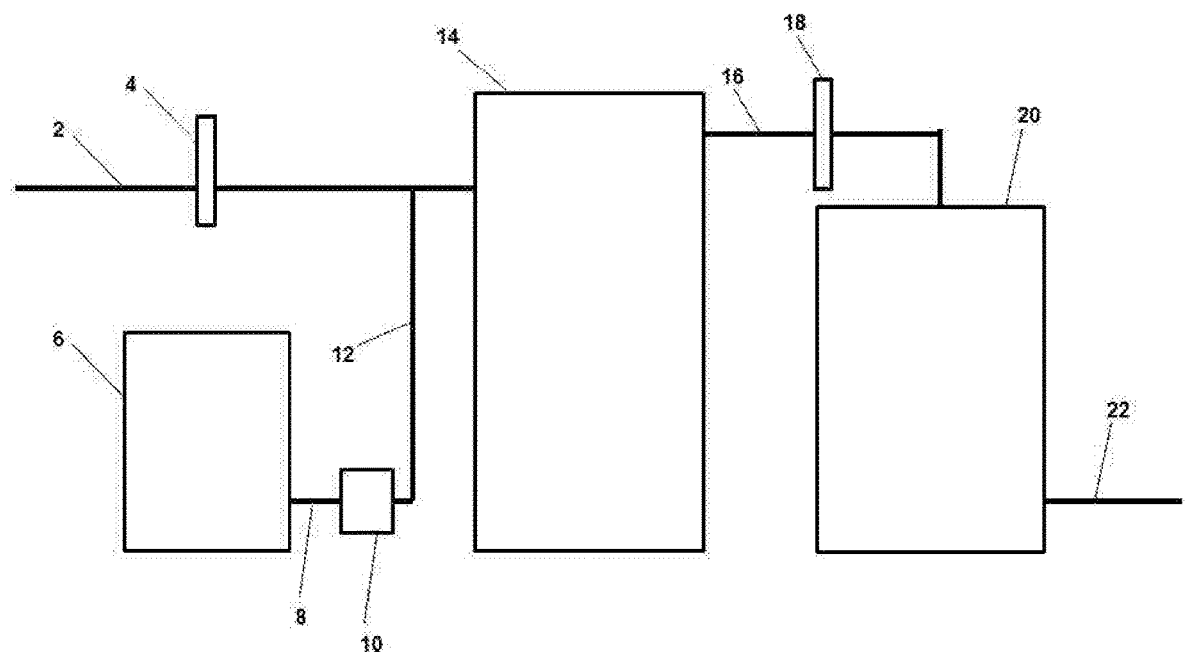
FIG. 1 is a schematic drawing of an electrolysis system which uses a brine modified by the additional halide ions, acids, and a halogen stabilization compound wherein all of the modification chemicals are added through a single injection system.

Throughout the specification and claims, the term "brine" means any aqueous solution comprising at least one halide ion species, for example chloride ($Cl^-$), bromide ($Br^-$), iodide ($I^-$), and the like, in any combination and/or concentration. As used throughout the specification and claims, the term "aqueous halogen solution" means any aqueous solution containing at least one free halogen species. Examples of molecular halogens include chlorine ($Cl_2$), bromine ($Br_2$), iodine ($I_2$), and the like, interhalogen combinations thereof (such as BrCl, BrI, ClI, and the like), or combinations of all possible molecular halogen compounds. It is well known to those skilled in the art that the relative speciation of aqueous halogens is a function of pH, with molecular halogens being favored at low pH, hypohalous acids being favored at moderate pH, and hypohalite ions being favored at high pH. Examples of hypohalous acids include hypochlorous acid (HOCl), hypobromous acid (HOBr), hypoiodous acid (HOI), and the like. Examples of hypohalites include hypochlorite ($ClO^-$), hypobromite ($BrO^-$), hypoiodite ($IO^-$), and the like. In the case of molecular chlorine, too high of a chlorine concentration can result in a serious hazard in that chlorine gas can readily evolve from a low pH solution. As used throughout the specification and claims, the term "free halogen" means a molecular halogen, a hypohalous acid, a hypohalite ion, or any combination thereof.

As used throughout the specification and claims, the term "halogen stabilizing compound" refers to a chemical which can combine with free halogens to produce a new chemical that is stabilized, including sulfamic acid, hydantoin and its derivatives, succinimide and its derivatives, cyanuric acid, organic amine compounds, and the like. Here, organic amine compounds mean chemical compounds that have at least one nitrogen, where that nitrogen is chemically bonded to at least one carbon and at least one hydrogen. As used throughout the specification and claims, the term "stabilized" means microbiocidally active but less chemically reactive than the corresponding free halogen. The term "microbiocidally active" means having the ability to destroy microbial species or prevent them from being infectious or reproducing. The term "less chemically reactive" means having decreased reactivity towards oxidant demanding substances such as organic compounds, low oxidation state transition metals, and sulfur containing compounds. As used throughout the specification and claims, the term "stabilized halogen compound" means a chemical species comprising a free halogen that has been stabilized through reaction with a halogen stabilizing compound. Examples of stabilized halogen compounds include N-chlorosulfamic acid, N,N-dichlorosulfamic acid, and the like. As used throughout the specification and claims, the term "downstream components" refers to components of a complete electrolysis system which are exposed to the product produced through electrolysis of a brine after that product is output from the electrolytic cell. As used throughout the specification and claims, the term "low pH" means having a pH of less than or equal to approximately 3.

Electrolysis of brines is well known to those skilled in the art as an effective way to produce aqueous disinfectant solutions on an as-needed basis. Electrolytic production of halogen-based solutions from brines works primarily through the anodic oxidation of halide ions ($X^-$) to produce aqueous molecular halogens ($X_2$):

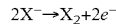
$$2X^- \rightarrow X_2 + 2e^-$$

Molecular halogens will then react with water in the brine, yielding hypohalous acid (HOX) and hydrohalic acid (HX):

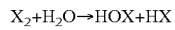
$$X_2 + H_2O \rightarrow HOX + HX$$

Hypohalous acids can then disproportionate to yield hypohalite ions (XO—), depending on the pH of the aqueous environment:

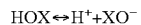
$$HOX \leftrightarrow H^+ + XO^-$$

Cathodic reactions primarily involve the reduction of water to produce hydrogen gas ($H_2$) and hydroxide ions ($HO^-$):

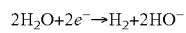
$$2H_2O + 2e^- \rightarrow H_2 + 2HO^-$$

Beyond the production of the aqueous halogen species at the anode and hydrogen gas at the anode, the pH at and near the anode is typically highly acidic (typically, pH<2) while the pH at and near the cathode surface is highly basic (typically pH>10). During halide electrolysis processes in undivided electrolytic cells, where the products of both the cathode electrode and anode electrode are able to freely mix, it is often observed that the pH of the electrolyzed solution is typically higher than the pH of the precursor brine. Additionally, as is well known by those skilled in the art, interhalogen oxidation processes can also occur. Interhalogen oxidation is a process whereby one halogen reacts with a different halide ion, resulting in the first halogen being reduced to the corresponding halide and the second halide being oxidized to the corresponding halogen. For example, hypochlorite can react with bromide, producing chloride and hypobromite:

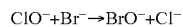
$$ClO^- + Br^- \rightarrow BrO^- + Cl^-$$

Both this process, as well as the direct electrolysis of different halide ions, can lead to the production of the plurality of aqueous halogen species described above.

Many industrial processes produce wastewater solutions containing high concentrations of halide ions, and these wastewater solutions can be used as brines in embodiments of present invention. Examples of such brines include reject streams from reverse osmosis water filtration processes and flowback or produced waters from oil and gas production operations. Alternatively, natural brines such as ocean water can also be utilized in the practice of the present invention. Often, it would be considered advantageous to utilize these brines in the production of disinfectant solutions through electrolytic processes known in the art. Not only would such a process decrease waste disposal costs associated with the source brines in the case of re-using wastewaters from industrial processes, but would also decrease costs related to the acquisition of disinfectants required for various water treatment purposes.

While the desired halide ion oxidation reactions will take place when brines such as those listed previously are subjected to electrolysis, in the case of brines having a low halide content the electrolysis process will not be able to occur with a high degree of efficiency. Therefore it can be beneficial to modify the brines through the injection of additional halide ions to optimize the overall electrolysis process. These additional halide ions are preferably combined with the brine through the injection of a concentrated aqueous halide solution into the brine prior to electrolysis. Such a concentrated solution preferably comprises sodium chloride, although other halide containing salts can also be used in the practice of the present invention.

Further, brines such as those listed previously typically have substantial amounts of scale-forming components such as, but not limited to, calcium ions, magnesium ions, iron ions, manganese ions, and sulfate ions. The presence of such ions can cause the scaling of the electrodes within the electrolytic cell, thereby causing system failure and potentially the loss of electrolysis equipment. Additionally, scales which are formed in the electrolytic cell can be carried to system components downstream of the electrolytic cell, where they can collect and cause additional operational challenges. An example of such scale includes the formation of calcium carbonate in the high pH environments at and near the cathode surface, resulting in the production and deposition of a calcium carbonate scale on the cathode as well as in components of the generation system downstream of the electrolytic cell. Here, the term "high pH" means a pH of greater than 10. While it is possible to manually clean electrolytic cells and downstream components where scales have formed, for example by flushing the electrolysis system with acid or using an automated cell cleaning process such as reverse polarity cleaning, these processes may not be feasible for waters containing high concentrations of scale causing components, because maintenance or electrolytic cell replacement costs will likely outweigh the benefit of biocide production.

Removal of scale in electrolysis systems is typically achieved through the use of acids to decrease the pH of water in contact with surfaces upon which scale has built up. Nearly any acid can be used to achieve this goal, provided the specific acid does not cause damage to the surfaces which are being cleaned. In an electrolytic cell, where the scales are typically based predominantly on calcium and magnesium, muriatic/hydrochloric acid is the most common acid used to remove the scale. Removal of calcium, magnesium, and similar scales is achieved in these embodiments by exposing the scaled surfaces within the electrolytic cell to acidic water where the pH is lower than about 7, preferably lower than about 5, and more preferably less than about 3.

Acidification of a brine which comprises scale causing components such as calcium is one method to prevent scale formation. If a brine is acidified to the point to where both the brine and the resulting electrolyzed solution have a pH less than 7, preferably less than 5, and more preferably less than 3, it is expected that scale formation, and more importantly the buildup of scale both within the electrolytic cell as well as in downstream components of the electrolytic cell, will be inhibited.

While acidification of a brine prior to electrolysis so that the an acidic electrolysis product solution is obtained is advantageous with regards to the prevention of scale on electrode surfaces, it can be disadvantageous since, under highly acidic conditions, the solutions produced through the electrolysis of acidified brines may contain substantial amounts of molecular chlorine. Molecular chlorine in a low pH aqueous environment is well known to those skilled in the art to result in the evolution of chlorine gas, resulting in conditions that may be hazardous to workers. It is also well known to those skilled in the art that the amount of molecular chlorine present in aqueous chlorine solutions is a function of both the total chlorine concentration as well as the pH of the solution, with appreciable amounts of molecular chlorine being present in an aqueous chlorine solution when the pH of the solution is less than about 4.

Low pH acidic conditions within the electrolytic cell can also encourage the formation of other types of scales, such as those based on amorphous silica, which is known to be more water soluble in basic conditions than in acidic conditions, as described by Alexander in "The Solubility of Amorphous Silica in Water", published in the *Journal of Physical Chemistry* in 1954 on pages 453-455. Although scales such as these are expected to form much more slowly due to the relatively low concentration of silica compared with high concentration components which produce scales in the basic solution environment typically found inside an operational electrolytic cell, some acid-insoluble scales are expected to form over time and will need to be removed from the electrode surfaces.

During halide electrolysis processes, the pH of the brine is typically seen to increase as a result of electrolysis, with a typical increase of 1-3 pH units observed. An increase pH is typically difficult to predict since a number of factors, such as the alkalinity of the water, the amount of halide present in the water, the initial pH of the water, and the efficiency of the electrode, as well as other factors, can all impact this pH change during electrolysis. Adding sufficient acid to acidify both the brine as well as the oxidant solution typically results in an oxidant solution with low pH, unless the addition of acid is very strictly regulated, which is extremely difficult to reliably accomplish under field conditions.

When brines are acidified to prevent the formation of scale, it can also be advantageous to modify the brine through the addition of a halogen stabilizing compounds such as, but not limited to, sulfamic acid. Halogen stabilization compounds such as sulfamic acid will react with the halogens produced through the electrolysis of halide ions, yielding compounds such as, but not limited to, N-chlorosulfamic acid and N,N-dichlorosulfamic acid. Such stabilized halogen compounds are non-volatile, therefore removing the hazard of chlorine gas evolution, but are also effective biocides, therefore maintaining the desired goal of producing a biocide. Moreover, stabilization of the halogens can have other process benefits such as decreased corrosivity and decreased reactivity towards other components of either a brine used in the practice of the present invention or a water being treated by the product of the practice of the present invention.

Most brines of interest for the practice of embodiments of the present invention, including flowback waters from oil and gas production operations, produced waters from oil and gas production operations, concentration from reverse osmosis or sea water, and raw sea water contain ammonia or ammonium ion containing compounds in addition to the desired halide ions. Ammonia is well known to react with aqueous halogens to rapidly produce ammonia haloamines, which are chemical compounds resulting from replacing at least one nitrogen-hydrogen bond in ammonia with a nitrogen-halogen bond. In the case of the reaction of ammonia and aqueous chlorine, a simplified chemical reaction scheme explains the production of three primary haloamines, namely monochloramine ($NH_2Cl$), dichloramine ($NHCl_2$), and trichloramine ($NCl_3$):

$$NH_3 + HOCl \rightarrow NH_2Cl + H_2O$$

$$NH_2Cl + HOCl \rightarrow NHCl_2 + H_2O$$

$$NHCl_2 + HOCl \rightarrow NCl_3 + H_2O$$

Of these chloramines, monochloramine is typically seen as the most desirable since it is well known to be a relatively stable and effective biocide. Dichloramine is known to be a more effective biocide as compared to monochloramine, but it is also less stable and therefore less desirable. Trichloramine is the most undesirable chloramine as it is highly chemically reactive and is an irritant. While highly complex, chloramine chemistry and the mixture of chloramines resulting from the reaction between aqueous chlorine and ammonia is primarily controlled by two factors: the ratio of chlorine to ammonia as well as the pH of the solution. With respect to pH, monochloramine is generally dominant or the only chloramine species present when the pH is greater than about 7.5. Both monochloramine and dichloramine will be present when the pH ranges between about 4 and about 7.5, while when the pH is less than about 4 trichloramine is present and is the dominant species when the pH is less than about 2. Therefore, even if stabilization of the halogens is accomplished through the use of a stabilizer such as sulfamic acid, either alone or in combination with other halogen stabilization agents, if there is ammonia present in the brine to be used in the practice of the present invention, prior art suggests that it is undesirable for the pH of the oxidant solution to be below about 4 since this would lead to the production and evolution of trichloramine.

The present invention unexpectedly enables the production of highly acidic microbiologically active solutions comprising stabilized halogen compounds produced through the electrolysis of brines conditioned through the addition of an acid and a halogen stabilizing compound or, in the examples below, sulfamic acid alone, which acts as both an acid and a halogen stabilizing compound. While the electrolysis of these brines without conditioning with sulfamic acid results in the production of solutions with very strong chloramine odors, indicating the production of dichloramine and trichloramine, the addition of a sufficient amount of sulfamic acid prevents the noticeable production of dichloramine and trichloramine, even when the pH of the electrolyzed solution less than 3. As discussed above, it is advantageous to practice embodiments of the present invention such that both the conditioned brine, as well as the electrolyzed solution produced from said brine, are both acidic (i.e. the pH both before and after electrolysis is less than 3). Under these conditions, sulfamic acid ($H_2N(CH_2)_2SO_3H$) added to the brine prior to electrolysis will react with hypochlorous acid (HOCl) to produce N-chlorosulfamic acid ($HClN(CH_2)_2SO_3H$) and N,N-dichlorosulfamic acid ($Cl_2N(CH_2)_2SO_3H$):

$$H_2NSO_3H + HOCl \rightarrow HClNSO_3H + H_2O$$

$$HClNSO_3H + HOCl \rightarrow Cl_2NSO_3H + H_2O.$$

Transchloramination chemical reactions can also occur where ammonium ions can react with N-chlorosulfamic acids and sulfamic acid can react with ammonia chloramines, resulting in very complex chemical processes which can occur when solutions comprised of chloride, ammonia, and sulfamic acid are electrolyzed:

$$H_2NSO_3H + NH_2Cl \rightarrow HClNSO_3H + NH_3$$

$$H_2NSO_3H + NHCl_2 \rightarrow HClNSO_3H + NH_2Cl$$

$$H_2NSO_3H + NCl_3 \rightarrow HClNSO_3H + NHCl_2$$

$$HClNSO_3H + NH_2Cl \rightarrow Cl_2NSO_3H + NH_3$$

$$HClNSO_3H + NHCl_2 \rightarrow Cl_2NSO_3H + NH_2Cl$$

$$HClNSO_3H + NCl_3 \rightarrow Cl_2NSO_3H + NHCl_2$$

$$NH_3 + HClNSO_3H \rightarrow NH_2Cl + H_2NSO_3H$$

$$NH_2Cl + HClNSO_3H \rightarrow NHCl_2 + H_2NSO_3H$$

$$NHCl_2 + HClNSO_3H \rightarrow NCl_3 + H_2NSO_3H$$

$$NH_3 + Cl_2NSO_3H \rightarrow NH_2Cl + HClNSO_3H$$

$$NH_2Cl + Cl_2NSO_3H \rightarrow NHCl_2 + HClNSO_2H$$

$$NHCl_2 + Cl_2NSO_3H \rightarrow NCl_3 + HClNSO_2H.$$

Even though these reactions are expected to take place in an equilibrium which, at low pH, would be driven to production of dichloramine and trichloramine since these species will readily volatilize from water, it was unexpectedly discovered that the incorporation of a sufficient amount of sulfamic acid relative to the amount of ammonia in the water is able to prevent the formation of amounts of dichloramine and trichloramine greater than their odor detection thresholds when waters containing sulfamic acid, chloride, and ammonia are electrolyzed, as measured by the odor of the electrolyzed solution. It is expected that the conditioning of brines with halogen stabilizing agents other than, or in combination with, sulfamic acid will achieve the same desired result of suppressing dichloramine and trichloramine as long as the total amount of halogen stabilizing agent is added to the brine in sufficient amount relative to the ammonia.

Similarly, a sufficient amount of the sulfamic acid, or other halogen stabilizing compound, relative to halide ions naturally present in the brine, is preferably added to the brine prior to electrolysis such that the total chlorine in the electrolyzed solution is no more than 20% free halogen as measured by N,N-diethyl-1,3-phenylenediamine (DPD) free chlorine and total chlorine test procedures. This will minimize the amount of chlorine gas generation in the production low pH oxidant solutions.

Alternatively, suppressing or preventing the formation of undesirable molecular chlorine, trichloramine, and inorganic scales can be accomplished by regulating the pH of the electrolyzed solution, such as by adding a buffering component to the brine prior to electrolysis. The presence of a buffering component can modulate the changes in pH which occur during the electrolysis of a brine and ensure that the pH of the solution both before and after electrolysis is in the range which can prevent scale formation during electrolysis or remove scale produced from the electrolysis process, and maintain the pH in a range which prevents the formation of molecular chlorine and trichloramine. In the practice of the present invention, any buffering agent which does not chemically react with components of the brine or electrolyzed solution, other than to regulate pH by reacting with hydrogen and hydroxide ions produced through the electrolysis process, can be used in the practice of this embodiment of the present invention. The buffering agent is preferably a phosphate buffer such as monobasic lithium phosphate ($LiH_2PO_4$), monobasic sodium phosphate ($NaH_2PO_4$), monobasic potassium phosphate ($KH_2PO_4$), dibasic lithium phosphate ($Li_2HPO_4$), dibasic sodium phosphate ($Na_2HPO_4$), dibasic potassium phosphate ($K_2HPO_4$), tribasic lithium phosphate ($Li_3PO_4$), tribasic sodium phosphate ($Na_3PO_4$), tribasic potassium phosphate ($K_3PO_4$), or combinations thereof.

Additionally, it is also possible to use electrolytic cell polarity switching to effectuate cleaning of the electrode surfaces within the electrolytic cell. Polarity switching involves reversing the polarity of the electrolytic cell for a short cleaning cycle, and during reverse polarity operations, the anode under normal operations becomes the cathode and the cathode during normal operations becomes the anode. As described above, when energized, the aqueous solutions near the electrode surfaces will have vastly different properties as compared to the bulk solution within the electrolytic cell, with the pH near the anode being very acidic (pH less than 2) and the pH near the cathode being very basic (pH greater than 10). Scale formation and accumulation on electrode surfaces, within the cell body, and in downstream components of the electrolysis system is directly tied to the extreme pH values of these interfacial environments. While acidification of the brine prior to electrolysis will help prevent scale build up, especially within the electrolytic cell body and in downstream system components, acidification may not be sufficient to remove the scales which form directly on the cathode surface, which remain basic even if the brine has a pH of less than 3, nor will brine acidification prior to electrolysis address the buildup of acid insoluble scales on the anode surfaces. Periodically reversing the polarity of the electrolytic cell provides a mechanism by which the scales directly attached to the electrode can be removed effectively. Under reverse polarity operations, the brine near surfaces of the electrode that serves as the anode under normal operations will become very basic, with that basic solution then able to dissolve away acid insoluble scales such as silica. Similarly, under reverse polarity operations the brine near the surface of the electrode that serves as the cathode during normal operations will become very acidic, thus removing base insoluble scales such as calcium carbonate from the electrode surface. Periodicity and duration of reverse polarity cleaning cycles will be a function of several factors including, but not limited to, brine chemical and physical characteristics, electrolytic cell operational parameters, and duration of electrolysis under normal operating conditions. A plurality of sensors, combined with a control system, will be incorporated into all embodiments of the present invention to allow for automation of the reverse polarity cleaning operations in the practice of the present invention. As reverse polarity cleaning will only impact the electrode surfaces and will not address the build of scale within the electrolytic cell compartment or in components of a system downstream of the electrolytic cell, optimal system cleaning is expected to incorporate both reverse polarity as well as chemical brine modification as described above to ensure that all components of the electrolysis system can be cleaned during the electrolysis of brines.

Embodiments of the present invention comprise an on-site generation system containing an electrolytic cell wherein the primary function of said electrolytic cell is to oxidize halide ions in a brine so as to allow for the production of an free halogen or a solution comprising a stabilized halogen compound. Moreover, embodiments of the present invention are also capable of monitoring the composition of the brine and are able to modify the chemical properties of said brine through the automated injection of fresh water or aqueous solutions containing halide ions, halogen stabilization compounds, and acids as needed. The objectives of injecting these components are to modify the brine such that sufficient halides are present in the modified brine to efficiently allow for the electrolytic production of aqueous halogen solutions or solutions comprising a stabilized aqueous halogen compound, to ensure that the pH of brine is low enough so that an acidic solution remains after electrolysis is complete, and to prevent the formation of undesirable chemicals such as molecular chlorine and trichloramine.

Control systems in the present invention are useful to ensure that the desired outcomes are achieved without the build-up of scale within the electrolytic cell as well as downstream of the electrolytic cell. The control systems in the present invention can allow the multitude of embodiments of the present invention operate in a multitude of modes which are optimized for the treatment and electrolysis of various types of initial brines.

FIG. 1 shows a schematic drawing of an embodiment of the present invention. In this drawing, line 2 carries the brine to be electrolyzed, transferred from a source not shown in this diagram by a method not shown in this diagram. Brine within line 2 passes sensor 4, which measures properties of the brine including, but not limited to, flow rate, total dissolved solids content, conductivity, pH, salinity, and/or temperature. Tank 6 contains an aqueous solution which is used to modify the properties of the brine contained in line 2. The aqueous solution contained within tank 6 may comprise halide ions, acids, halogen stabilization compounds, or any desirable combination thereof. The solution within tank 6 is transferred along line 8 by the action of pump 10 into line 12 where the modification solution is combined with the flow within line 2. The combined flow then enters on-site generation system 14, which contains the electrolytic cell as well as all of the other components needed to run and monitor the overall electrolysis process. Electrolyzed solution leaves on-site generator 14 along line 16 where it passes sensor 18 and is collected in tank 20. Sensor 18 measures desired properties of the electrolyzed solution, including pH. Solution collected in tank 20 is then transferred along line 22 using a mechanism not shown here to the desired application point. Additionally, a control system contained within on-site generation system 14 receives telemetry from sensors 4, 18, and other sensors not explicitly shown and also provides control over pumping mechanism 10, in addition to control other aspects of the on-site generation system well known to those skilled in the art.

In one preferred embodiment of the present invention, sensor 4 detects conductivity. In the practice of the present invention where the source brine comprises produced waters from oil and gas production operations, the actual halide content of the brine can vary significantly from moment to moment based on the actual source of the brine. For example, produced water at a salt water disposal well can be from multiple different well locations, with the halide content of the brine varying considerably depending on the source of that water. The relationships between pH changes during electrolysis, the amount of oxidant produced, the amount of acid or stabilizing agent required to moderate both brine pH and oxidant pH are all non-linearly related to the amount of halide present in the brine to be electrolyzed. In order to maintain precise control over the properties of both the brine and the oxidant to have a brine of the preferred pH and an oxidant of the preferred pH, oxidant content, and chemical form of the oxidant, the amount of acid and stabilizing agent added to the brine prior to electrolysis is preferably strictly regulated.

Figure 2:
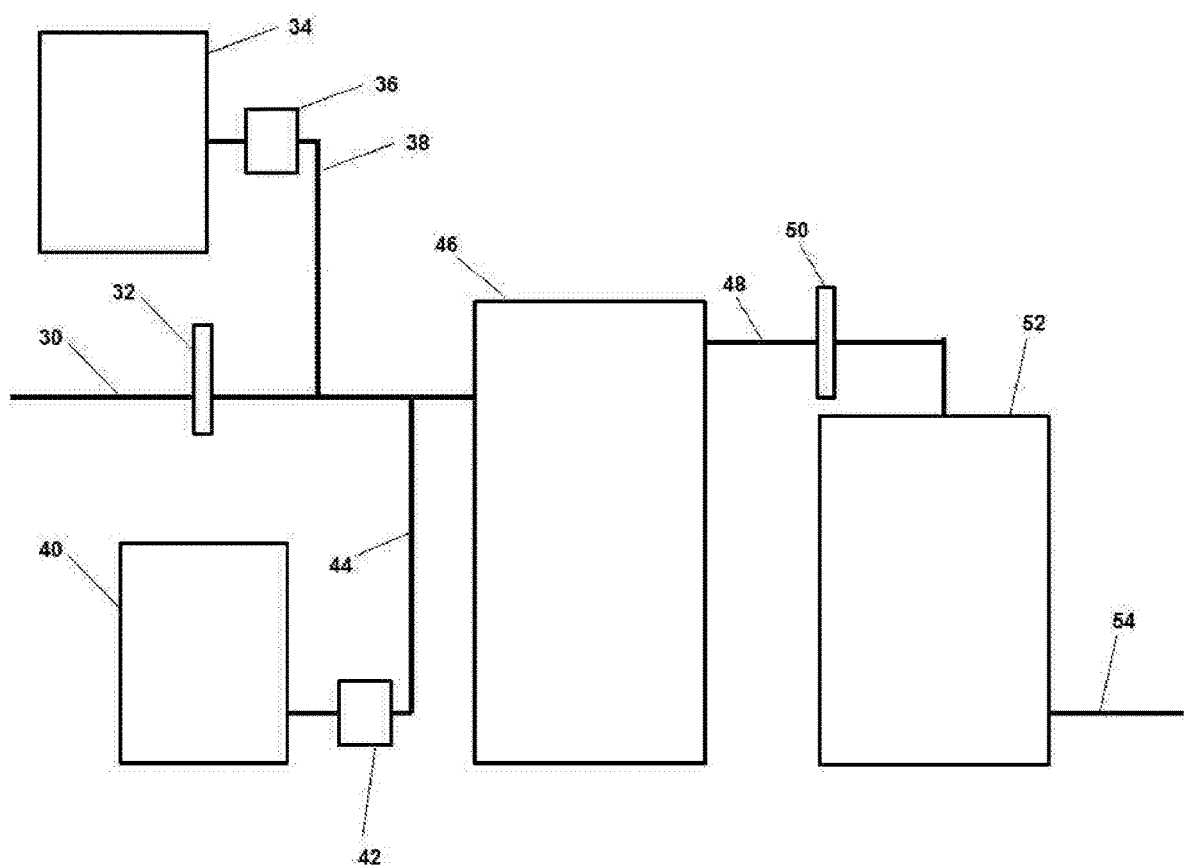
FIG. 2 is a schematic drawing of an electrolysis system which uses a brine modified by the additional halide ions, acids, and a halogen stabilization compound wherein the additional halide and the halogen stabilization compound/acid are injected through two independent injection systems.

An alternative embodiment of the present invention is depicted in FIG. 2. In this embodiment of the present invention, line 30 carries the brine to be electrolyzed, transferred from a source not shown in this diagram by a method not shown in this diagram. Brine within line 30 passes sensor 32, which can measure properties of the brine including, but not limited to, total dissolved solids content, conductivity, pH, salinity, and/or temperature. Tank 34 contains an aqueous metal halide solution, which is transferred through the action of pump 36 along line 38 and injected into the flow in line 30. Tank 40 contains an aqueous solution preferably comprising a halogen stabilization compound and an acid, which is transferred through the action of pump 42 along line 44 where it is injected into the flow along line 30. The combined flow then enters on-site generation system 46, which contains the electrolytic cell as well as all of the other components needed to run and monitor the overall electrolysis process. Electrolyzed solution leaves on-site generator 46 along line 48 where it passes sensor 50 and is collected in tank 52. Sensor 50 measures desired properties of the electrolyzed solution, including pH. Solution collected in tank 52 is then transferred along line 54 using a mechanism not shown here to the desired application point. Additionally, a control system contained within on-site generation system 46 receives telemetry from sensors 32, 50, and other sensors not explicitly shown and also provides control over pumping mechanisms 38 and 42, in addition to control other aspects of the on-site generation system well known to those skilled in the art.

Figure 3:
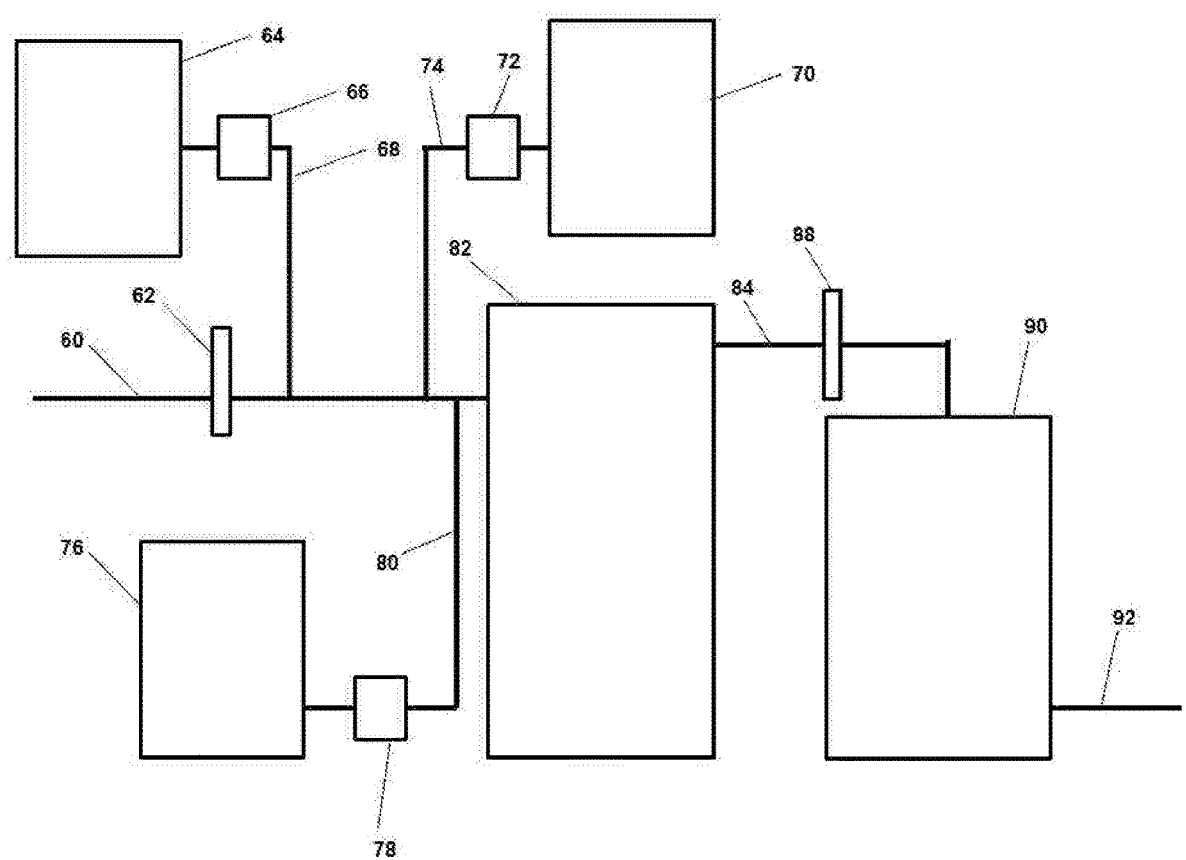
FIG. 3 is a schematic drawing of an electrolysis system which uses a brine modified by the additional halide ions, acids, and a halogen stabilization compound wherein the injection of halide ions, acids, and halogen stabilization compounds is carried out using three independent injection systems.

Another alternative embodiment of the present invention is depicted in FIG. 3. In this embodiment of the present invention, line 60 carries the brine to be electrolyzed, transferred from a source not shown in this diagram by a method not shown in this diagram. Brine within line 60 passes sensor 62, which can measure properties of the brine including, but not limited to, total dissolved solids content, conductivity, pH, salinity, and/or temperature. Tank 64 contains an aqueous metal halide solution, which is transferred through the action of pump 66 along line 68 and injected into the flow in line 60. Tank 70 contains an aqueous solution preferably comprising a halogen stabilization compound, which is transferred through the action of pump 72 along line 74 where it is injected into the flow along line 60. Tank 76 contains an aqueous solution preferably comprising an acid, which is transferred through the action of pump 78 along line 80 where it is injected into the flow along line 60. The combined flow then enters on-site generation system 82, which contains the electrolytic cell as well as all of the other components needed to run and monitor the overall electrolysis process. Electrolyzed solution leaves on-site generator 82 along line 84 where it passes sensor 88 and is collected in tank 90. Sensor 88 measures desired properties of the electrolyzed solution, including pH. Solution collected in tank 90 is then transferred along line 92 using a mechanism not shown here to the desired application point. Additionally, a control system contained within on-site generation system 82 receives telemetry from sensors 62, 88, and other sensors not explicitly shown and also provides control over pumping mechanisms 66, 72, and 78, in addition to control other aspects of the on-site generation system well known to those skilled in the art.

In the practice of the embodiments of the present invention depicted in FIGS. 1-3, the pH of the brine after modification is preferably less than 4, more preferably less than 3, and most preferably less than 2. The pH of the electrolyzed solution is preferably less than 7, more preferably less than 5, and most preferably less than 3. Depending on the known chemical nature of the brine to be electrolyzed, the aqueous solutions used to modify the brine can contain any desired halide ion salts, acids, or halogen stabilization compounds, and any combination thereof depending on the specific embodiment of the present invention. The halide ion salt is preferably sodium chloride, but can be any other metal halide compound such as, but not limited to, lithium chloride, potassium chloride, lithium bromide, sodium bromide, potassium bromide, lithium iodide, sodium iodide, potassium iodide, or combinations thereof. The halogen stabilization compound preferably comprises sulfamic acid, but can be any chemical compound known to combine with, and thereby stabilize, aqueous halogens. Examples of other halogen stabilization compounds which could be used in the present invention include, but are not limited to, cyanuric acid, hydantoin, succinimide, and 5,5-dimethylhydantoin. Alternatively, other organic amines (i.e. chemical compounds containing at least one nitrogen wherein the at least one nitrogen is chemically bound to at least one hydrogen atom and at least one carbon atom) can be used in place of the stabilization compounds listed previously. The acid component preferably comprises sodium dihydrogen phosphate, but may comprise any acidic compound including, but not limited to, hydrochloric acid, phosphoric acid, sulfuric acid, sodium bisulfate, potassium dihydrogen phosphate, or combinations thereof.

The aqueous solutions being used to modify the brine to be electrolyzed in the practice of the present invention can be further modified by the incorporation of agents such as ethylenediaminetetraacetic acid (EDTA), which is used to prevent the formation of scales such as barium sulfate within the generation apparatus. Additional components that can be included in these aqueous solutions include quaternary ammonium compounds, surfactants, polymers or other chemicals compatible with the overall electrolysis process which can also provide a benefit when dosed into the receiving water.

Injection of the acid component, either alone or in conjunction with halide ions and/or halogen stabilization compounds depending on the specific embodiment of the present invention, can preferably be automatically turned off by the control systems contained within the electrolysis systems. The objective of this aspect of the present invention is to periodically allow for a high pH environment to exist within the electrolytic cell, thereby enabling the removal of acid-insoluble scales, such as silica scales, which may form on electrodes in the low pH environment which occurs as a result of acid modification of the brine. Stopping the acid modification of the brine can occur as part of a pre-programmed cycle based on the known properties of the brine being electrolyzed or, optionally, can be induced as a result of telemetry acquired from sensors within the electrolytic cell or those measuring the composition of the brine or electrolyzed solution. Similarly, the duration of electrolytic cell operation wherein brine that had not been acid modified is electrolyzed can be pre-determined based on known properties of the brine or determined based on telemetry obtained from sensors of the present invention.

Figure 4:
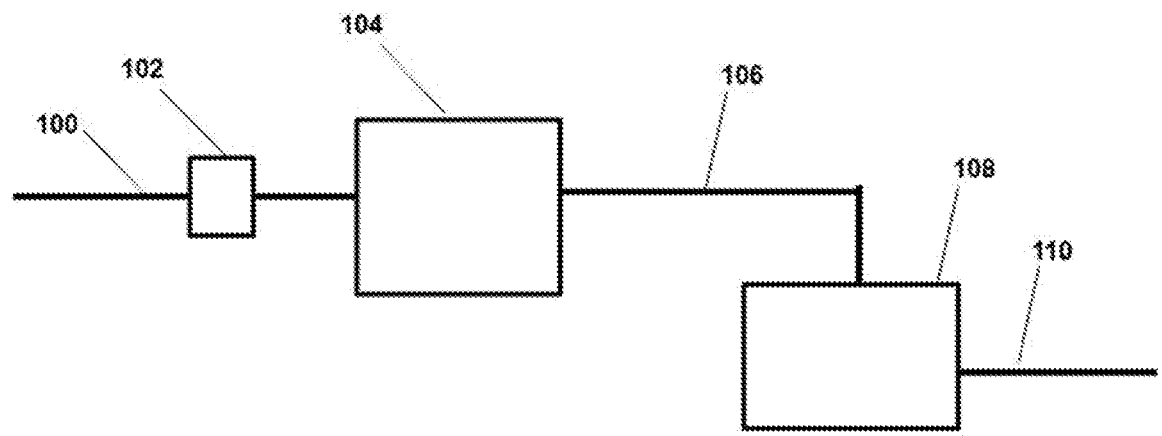
FIG. 4 is a schematic drawing of an electrolysis system in which there is no automated modification of the brine prior to electrolysis.

An alternative embodiment of the present invention is depicted in FIG. 4, in which line 100 carries the brine to be electrolyzed, which is pumped via pump 102 into electrolytic cell 104. The action of both pump 102 and electrolytic cell 104 are preferably managed through a plurality of sensors and a control system not shown. Electrolyzed brine exits electrolytic cell 104 along line 106 and is stored in tank 108. The electrolyzed solution in tank 108 is then transferred along line 110 using a mechanism not depicted here to the desired application point.

Figure 5:
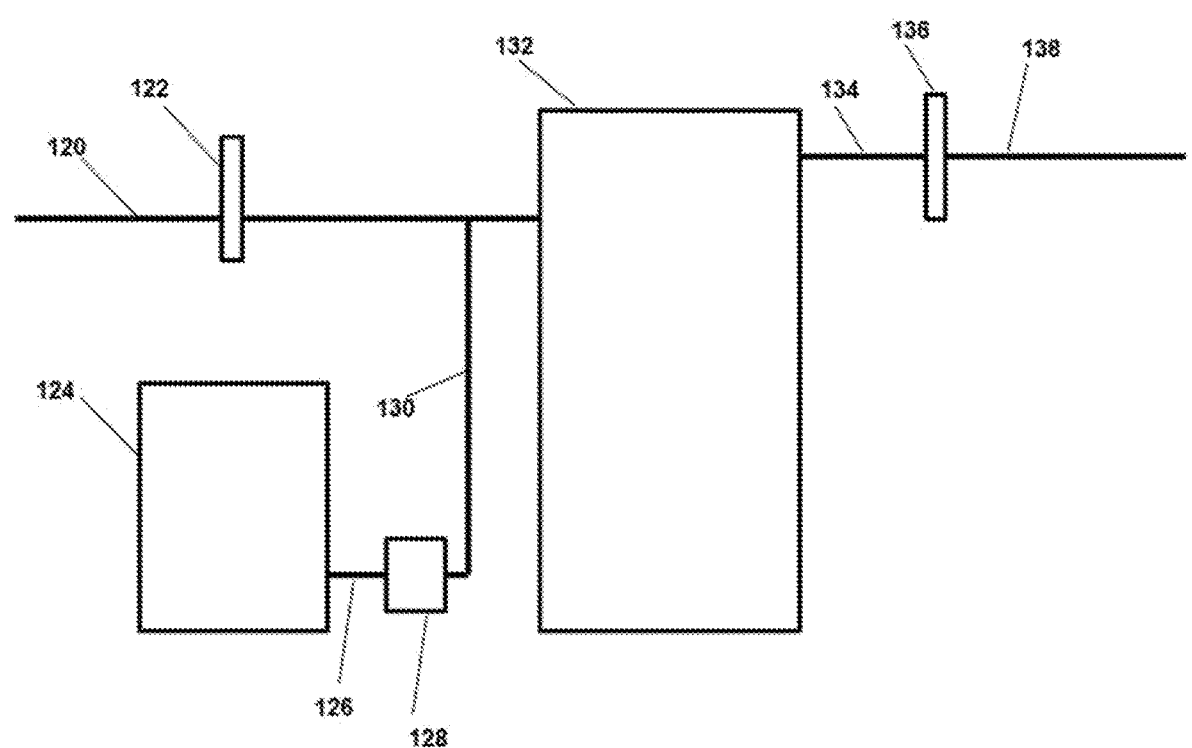
FIG. 5 is a schematic drawing of an electrolysis system similar to the system shown in FIG. 1 but which does not collect the electrolyzed solution prior to the application of said solution.

Another embodiment of the present invention is depicted in FIG. 5. In this embodiment, line 120 contains the brine to be electrolyzed which is moved through the line using a mechanism not shown here past sensor suite 122. Tank 124 contains the solution that is used to modify the nature of the brine in line 122, and the solution from tank 124 is passed through line 126 through the action of pumping mechanism 128 along line 130 and is finally delivered to the fluid in line 120. The combined flow then enters on-site generation system 132, which contains the electrolytic cell as well as all of the other components needed to run and monitor the overall electrolysis process. Electrolyzed solution leaves on-site generator 132 along line 134 where it passes sensor 136 and into line 138, where it is delivered to the application point. Although not shown, the embodiment of the present invention described by FIG. 5 preferably comprises a hydrogen gas removal mechanism downstream of on-site generator 132 before the electrolyzed solution is delivered to the desired application point.

One skilled in the art will realize that other embodiments of the present invention, not explicitly taught in the preceding embodiments, can likewise achieve the desired goal of the present invention to control the electrolysis of a brine such that a halogen-based solution is produced under conditions that maximize the halide conversion and electrical energy consumption of the process, minimize maintenance requirements for the electrolytic cell, and do not result in the undesired production of chlorine gas or other undesirable chemicals.

A plurality of sensors is preferably used to provide telemetry regarding the chemical and physical characteristics of both the brine and the electrolyzed solution as well as the operational conditions of the electrolytic cell. Chemical and physical characteristics of the brine and electrolyzed solution that will preferably be measured by the sensors include, but are not limited to, the flow rate, temperature, pH, total dissolved solids content, chloride ion content, conductivity, and salinity. Sensors measuring the operational status of the electrolytic cell will preferably measure parameters such as, but not limited to, cell current, cell voltage, plate-to-plate voltage, and current density. Data collected by these sensors is preferably transmitted to an overall control system for monitoring the overall operation of the electrolysis process. Moreover, this control system will also preferably controls operational aspects of the overall electrolysis system, including, but not limited to, the flow of the brine into the system, the amount of acids, buffers, halogen stabilizing compounds, or other additives to the brine prior to electrolysis, as well as the operational aspects of the electrolytic cell. The control system preferably optimizes the overall electrolysis process in terms of maximizing the production of the microbicidal component (i.e. either free halogen or stabilized halogen) of the electrolyzed solution, while minimizing the consumption of electricity and chemicals added to the brine prior to electrolysis as well as production downtime. Feedback from the plurality of sensors preferably enables the control system to determine when electrolytic cell operations need to switch from normal polarity to reverse polarity in order to effectuate a reverse polarity cleaning cycle.

Electrolysis in this process is preferably performed by setting a target cell current and the control system accordingly varying cell voltage, plate-to-plate voltage, and the delivery of additional halide ions or freshwater to the brine to meet the desired cell current, and to enable the electrolysis process to adapt to outside factors that influence cell current (for example the halide content of the unmodified brine as well as the temperature of the unmodified brine). In the context of the electrolytic cell operational parameters, the delivery of additional halides, preferably from an aqueous solution containing one more halide salt dissolved at high concentration (at or near saturation), increases the amount of halide ions present in the brine in order to maximize the production of free halogens or stabilized halogens. Also in the context of the electrolytic cell operational parameters, delivery of fresh water preferably dilutes the halide ion concentration in the unmodified brine such that free halogen or stabilized halogen production is maximized with regards to the energy input into the electrolytic cell. Similarly, the voltage applied to the cell is preferably modulated in order to produce the maximum amount of free halogens or stabilized halogens while minimizing the amount of energy, acids, halogen stabilizing compounds, or additional halide ions added to the brine prior to electrolysis. Control over the operational parameters of the electrolytic cell is preferably effectuated by use of the telemetry of the plurality of sensors described in other sections of this specification.

EXAMPLES

The following examples illustrate some of the core aspects of the present invention, specifically the modification of brines with halogen stabilization compounds, acids, and buffering agents. These examples are meant to teach the practice of the present invention, but should not be taken as limiting the practice of the present invention to what is described in the examples.

Example 1

Utilizing an electrolysis system similar to that depicted in FIG. 4, brines containing sodium chloride dissolved in water such that the chloride content varied between 1 and 100 g/L were electrolyzed with an applied cell plate-to-plate voltage of 6V. Electrolytic cells used in this and all following examples are undivided and allow for the solutions produced by both anodic and cathodic electrolysis processes to mix freely within the electrolytic cell compartment. Prior to electrolysis, the pH of these brines was measured along with the pH, Free Available Chlorine (FAC) concentration, which is the amount of free halogen, and Total Chlorine (TC) concentration, which is the amount of free halogen and haloamine (including stabilized halogen compounds) of the oxidant solutions. In this examples and all subsequent examples, FAC and TC concentrations are measured using standard N,N-diethyl-1,3-phenylenediamine (DPD) chemistry methods. These measurements are recorded in Table 1. As can be seen, increasing the amount of chloride in the brine resulted in an increase in the amount of FAC/TC produced as a result of electrolysis. However, unexpectedly, the amount of FAC/TC was not found to be linearly proportional to the amount of chloride present in the solution. Further, the increase in pH as a result of electrolysis also was not found to be linear with the increasing amount of chloride in the brine and FAC/TC produced as a result of electrolysis. As expected since only free chlorine is produced in this process, both the FAC and TC measurements of the oxidant solutions produced in this example give numbers that are essentially identical within the error of the method used to make these measurements

TABLE 1

| Brine Chloride Content (g/L) | Brine pH | Oxidant pH | Oxidant FAC Content (mg/L) | Oxidant TC Content (mg/L) |
|---|---|---|---|---|
| 1 | 7.72 | 8.76 | 175 | 177.5 |
| 5 | 7.47 | 9.00 | 1010 | 1050 |
| 25 | 7.05 | 9.10 | 4600 | 4650 |
| 50 | 7.01 | 9.23 | 7400 | 7500 |
| 100 | 7.07 | 9.19 | 10,600 | 11,000 |

Example 2

Utilizing an electrolysis system similar to that depicted in FIG. 1, brines containing sodium chloride dissolved in water such that the chloride content varied between 5 and 100 g/L were electrolyzed with an applied cell plate-to-plate voltage of about 4.3V. Using this embodiment of the present invention, no additional brine modification chemicals were injected into the brine during electrolysis. Measurements of the pH, Free Available Chlorine (FAC), and Total Chlorine (TC) properties of the oxidant solutions were made after electrolysis was completed. These measurements are recorded in Table 1, and these results again show that there is a non-linear relationship between the brine halide content and the composition of the produced oxidant solution.

TABLE 2

| Brine Chloride Content (g/L) | Oxidant pH | Oxidant FAC Content (mg/L) | Oxidant TC Content (mg/L) |
|---|---|---|---|
| 5 | 9.25 | 2500 | 2650 |
| 25 | 9.23 | 6200 | 6350 |
| 100 | 8.85 | 4850 | 5200 |

Example 3

Utilizing an electrolysis system similar to that depicted in FIG. 4, brines containing sodium chloride and hydrochloric acid dissolved in water such that the concentration of sodium chloride was 30 g/L and the pH of the brine ranged from 2-9 were electrolyzed with an applied plate-to-plate voltage of about 4.3 V. Prior to electrolysis, the pH of these brines was measured along with the pH and Free Available Chlorine (FAC) properties of the oxidant solutions. These measurements are compiled in Table 3. As can be seen, while the injection of hydrochloric acid can acidify the brine to within the desired brine pH range, it was not possible to produce an oxidant solution with the desired pH of less than 7 and greater than 4. While it might be possible to very carefully control the amount of acid injected to produce an oxidant solution with the desired pH, doing so under conditions where the relative amount of acid which needs to be injected into the brine stream is expected to be highly variable could very easily result in undesirable outcomes such as the production of chlorine gas or nitrogen trichloride.

TABLE 3

| Brine pH | Oxidant pH | Oxidant FAC Content (mg/L) |
|---|---|---|
| 2.09 | 3.535 | 460 |
| 3.01 | 7.775 | 805 |
| 4.05 | 7.845 | 650 |
| 5 | 7.88 | 560 |
| 6.05 | 8.235 | 690 |
| 7.04 | 8.675 | 695 |
| 8.09 | 8.82 | 650 |
| 9 | 9.12 | 625 |

Example 4

Utilizing an electrolysis system similar to that depicted in FIG. 4, brines containing sodium chloride and monobasic potassium phosphate ($KH_2PO_4$) dissolved in water such that the concentration of sodium chloride was 20 g/L and the concentration of monobasic potassium phosphate ranged between 0-200 g/L were electrolyzed with an applied plate-to-plate voltage of about 4.3 V. Prior to electrolysis, the pH of these brines was measured along with the pH and Free Available Chlorine (FAC) properties of the oxidant solutions. These measurements are compiled in Table 4. As can be seen, the incorporation of monobasic potassium phosphate into the brine was able to acidify both the brine and the oxidant and, unexpectedly, resulted in a oxidant solution with a pH in the desired range of between 4 to 5. However, at the high concentrations of potassium monobasic phosphate used in this example, degradation of electrolysis performance in terms of the amount of FAC produced was also observed.

TABLE 4

| Brine Monobasic Potassium Phosphate Content (g/L) | Brine pH | Oxidant pH | Oxidant FAC Content (mg/L) |
|---|---|---|---|
| 0 | 7.13 | 9.74 | 4094 |
| 40 | 4.13 | 5.79 | 3906 |
| 80 | 3.98 | 5.28 | 3650 |
| 200 | 3.78 | 4.52 | 2834 |

Example 5

Utilizing an electrolysis system similar to that depicted in FIG. 4, brines containing sodium chloride and sulfamic acid dissolved in water such that the chloride content varied between 1 and 100 g/L and the sulfamic acid content varied between a chloride to sulfamic acid molar ratio of 0.05:1 to 0.5:1 were electrolyzed with an applied cell plate-to-plate voltage of 6V. Prior to electrolysis, the pH of these brines was measured along with the pH, Free Available Chlorine (FAC), and Total Chlorine (TC) properties of the oxidant solutions. These measurements are recorded in Tables 5-9. As can be seen in the results of these tests, the relationship between the initial brine composition and the composition of the produced oxidant solution is extremely complex. For example, the amount of sulfamic acid that needs to be added to the brine to achieve an oxidant pH of less than three is different depending on the initial halide content of the brine.

TABLE 5

| Brine Chloride Content (g/L) | Brine Sulfamic Acid to Chloride Ratio | Brine pH | Oxidant pH | Oxidant FAC Content (mg/L) | Oxidant TC Content (mg/L) |
|---|---|---|---|---|---|
| 1 | 0.05:1 | 5.94 | 9.88 | 23 | 162 |
| 1 | 0.075:1 | 4.13 | 9.43 | 58 | 170 |

TABLE 5-continued

| Brine Chloride Content (g/L) | Brine Sulfamic Acid to Chloride Ratio | Brine pH | Oxidant pH | Oxidant FAC Content (mg/L) | Oxidant TC Content (mg/L) |
|---|---|---|---|---|---|
| 1 | 0.1:1 | 3.08 | 7.21 | 21 | 177 |
| 1 | 0.125:1 | 2.94 | 6.63 | 14 | 176 |
| 1 | 0.15:1 | 2.69 | 5.90 | 20 | 180 |
| 1 | 0.175:1 | 2.61 | 4.56 | 18 | 176 |
| 1 | 0.2:1 | 2.50 | 3.15 | 48 | 178 |
| 1 | 0.25:1 | 2.33 | 2.68 | 44 | 193 |
| 1 | 0.5:1 | 1.99 | 2.09 | 27.5 | 250 |

TABLE 6

| Brine Chloride Content (g/L) | Brine Sulfamic Acid to Chloride Ratio | Brine pH | Oxidant pH | Oxidant FAC Content (mg/L) | Oxidant TC Content (mg/L) |
|---|---|---|---|---|---|
| 5 | 0.05:1 | 2.35 | 11.42 | 250 | 1170 |
| 5 | 0.075:1 | 2.13 | 11.06 | 120 | 1220 |
| 5 | 0.1:1 | 1.96 | 9.94 | 80 | 1190 |
| 5 | 0.125:1 | 1.87 | 6.42 | 50 | 1100 |
| 5 | 0.15:1 | 1.81 | 2.48 | 70 | 1240 |
| 5 | 0.175:1 | 1.75 | 2.23 | 70 | 1220 |
| 5 | 0.2:1 | 1.70 | 2.03 | 80 | 1230 |
| 5 | 0.25:1 | 1.62 | 1.82 | 60 | 1220 |
| 5 | 0.5:1 | 1.37 | 1.36 | 40 | 1460 |

TABLE 7

| Brine Chloride Content (g/L) | Brine Sulfamic Acid to Chloride Ratio | Brine pH | Oxidant pH | Oxidant FAC Content (mg/L) | Oxidant TC Content (mg/L) |
|---|---|---|---|---|---|
| 25 | 0.05:1 | 1.53 | 11.71 | 500 | 5050 |
| 25 | 0.075:1 | 1.38 | 10.55 | 500 | 5300 |
| 25 | 0.1:1 | 1.28 | 9.56 | 200 | 5450 |
| 25 | 0.125:1 | 1.21 | 2.02 | 400 | 6050 |
| 25 | 0.15:1 | 1.09 | 1.55 | 150 | 5900 |
| 25 | 0.175:1 | 1.06 | 1.31 | 200 | 6200 |
| 25 | 0.2:1 | 1.03 | 1.16 | 200 | 6300 |

TABLE 8

| Brine Chloride Content (g/L) | Brine Sulfamic Acid to Chloride Ratio | Brine pH | Oxidant pH | Oxidant FAC Content (mg/L) | Oxidant TC Content (mg/L) |
|---|---|---|---|---|---|
| 50 | 0.05:1 | 1.11 | 10.09 | 900 | 7800 |
| 50 | 0.075:1 | 0.97 | 8.95 | 800 | 8700 |
| 50 | 0.1:1 | 0.88 | 1.49 | 300 | 9800 |
| 50 | 0.125:1 | 0.79 | 1.01 | 200 | 8800 |
| 50 | 0.15:1 | 0.76 | 0.82 | 400 | 9300 |

TABLE 9

| Brine Chloride Content (g/L) | Brine Sulfamic Acid to Chloride Ratio | Brine pH | Oxidant pH | Oxidant FAC Content (mg/L) | Oxidant TC Content (mg/L) |
|---|---|---|---|---|---|
| 100 | 0.05:1 | 0.63 | 6.62 | 1400 | 11600 |
| 100 | 0.075:1 | 0.51 | 0.59 | 600 | 11400 |
| 100 | 0.1:1 | 0.43 | 0.42 | 400 | 10000 |

Example 6

Utilizing an electrolysis system similar to that depicted in FIG. 4, brines containing sodium chloride, sulfamic acid, and monobasic sodium phosphate ($NaH_2PO_4$) dissolved in water such that the chloride was 10 g/L, the sulfamic acid content varied between a chloride to sulfamic acid molar ratio of 0.05:1 to 0.5:1, and the monobasic sodium phosphate content varied between 2-25 g/L were electrolyzed with an applied cell plate-to-plate voltage of 6V. Prior to electrolysis, the pH of these brines was measured along with the pH, Free Available Chlorine (FAC), and Total Chlorine (TC) properties of the oxidant solutions. These measurements are recorded in Tables 10-13. As these results demonstrate, there is a complex and non-linear relationship between the composition of the brine and the composition of the oxidant solution produced by electrolysis of a specific brine.

TABLE 10

| Brine Monobasic Sodium Phosphate Content (g/L) | Brine Sulfamic Acid to Chloride Ratio | Brine pH | Oxidant pH | Oxidant FAC Content (mg/L) | Oxidant TC Content (mg/L) |
|---|---|---|---|---|---|
| 2 | 0:1 | 5.17 | 7.33 | 1925 | 1950 |
| 2 | 0.05:1 | 1.99 | 10.13 | 575 | 2475 |
| 2 | 0.1:1 | 1.51 | 7.02 | 275 | 2650 |
| 2 | 0.15:1 | 1.40 | 2.48 | 225 | 2600 |
| 2 | 0.25:1 | 1.23 | 1.46 | 75 | 2900 |

TABLE 11

| Brine Monobasic Sodium Phosphate Content (g/L) | Brine Sulfamic Acid to Chloride Ratio | Brine pH | Oxidant pH | Oxidant FAC Content (mg/L) | Oxidant TC Content (mg/L) |
|---|---|---|---|---|---|
| 5 | 0:1 | 5.14 | 6.92 | 2250 | 2375 |
| 5 | 0.05:1 | 2.19 | 6.64 | 475 | 2350 |
| 5 | 0.1:1 | 1.86 | 6.08 | 475 | 2625 |
| 5 | 0.15:1 | 1.64 | 2.63 | 375 | 2675 |
| 5 | 0.25:1 | 1.37 | 1.57 | 50 | 2800 |

TABLE 12

| Brine Monobasic Sodium Phosphate Content (g/L) | Brine Sulfamic Acid to Chloride Ratio | Brine pH | Oxidant pH | Oxidant FAC Content (mg/L) | Oxidant TC Content (mg/L) |
|---|---|---|---|---|---|
| 10 | 0:1    | 4.81 | 6.38 | 2175 | 2271 |
| 10 | 0.05:1 | 2.40 | 6.05 | 500  | 2425 |
| 10 | 0.1:1  | 2.07 | 5.52 | 575  | 2600 |
| 10 | 0.15:1 | 1.84 | 2.67 | 250  | 2450 |
| 10 | 0.25:1 | 1.56 | 1.87 | 100  | 2700 |

TABLE 13

| Brine Monobasic Sodium Phosphate Content (g/L) | Brine Sulfamic Acid to Chloride Ratio | Brine pH | Oxidant pH | Oxidant FAC Content (mg/L) | Oxidant TC Content (mg/L) |
|---|---|---|---|---|---|
| 25 | 0:1    | 4.42 | 5.75 | 2125 | 2275 |
| 25 | 0.05:1 | 2.79 | 5.46 | 450  | 2350 |
| 25 | 0.1:1  | 2.47 | 5.04 | 475  | 2525 |
| 25 | 0.15:1 | 2.19 | 2.91 | 350  | 2650 |
| 25 | 0.25:1 | 1.94 | 2.27 | 275  | 2575 |

Example 7

Utilizing an electrolysis system similar to that depicted in FIG. 1, produced waters from oil and gas production operations were electrolyzed with and without the presence of added sulfamic acid. In this test, unmodified produced water was first electrolyzed as a control, and sulfamic acid was then added from a 15% solution so that the sulfamic acid concentration in the produced water was 5.3-13.2 g/L. These produced waters were then electrolyzed with an applied cell plate-to-plate voltage of 4-5 V, and cell current was recorded during electrolysis. Samples of the electrolyzed solutions were collected and analyzed for FAC content, TC content, and pH. Additionally, the presence or absence of chloramine odors emanating from the electrolyzed solution was also noticed. The results from these measurements are provided in Table 14. As can be seen, and as expected based on the data from laboratory experiments, the modification of produced water with sulfamic acid resulted in the production of oxidant solutions comprised primarily of sulfamic acid/sulfamate stabilized halogen (primarily chlorine). Increasing the sulfamic acid content had several impacts on the chemical nature of the electrolyzed solution, including increasing the total chlorine content of the solution, and initially increasing the pH of the electrolyzed solution with low sulfamic acid content and then rapidly decreasing the pH of the electrolyzed solution when the sulfamic acid content of the modified produced water was high. Importantly, and unexpectedly, there was a clear chloramine smell to the electrolyzed solution when no sulfamic acid was added or when a low amount of sulfamic acid was added prior to electrolysis. However, once the sulfamic acid content of the produced water prior to electrolysis was at least 5.3 g/L, the chloramine smell completely disappeared. This observation clearly contradicts the expectation of the presence of volatile chloramines when the pH of a solution is low and the absence of these compounds when the pH of the solution is high. These results indicated that, in both the control and the 4.0 g/L sulfamic acid produced waters, dichloramine and trichloramine were produced during the electrolysis process and persisted to some degree in the electrolyzed solution. This likely indicates that, under these conditions, these chloramines are forming at or near the anode during electrolysis and are being carried out of the electrolytic cell, either as part of the oxidant solution or, more likely, in the gas phase. When higher concentrations of sulfamic acid are added to the produced water prior to electrolysis, the formation of volatile dichloramine and trichloramine is clearly suppressed, possibly due to the presence of a large molar excess sulfamic acid relative to ammonia. Ammonia content in the waters used in these tests is typically approximately 100 mg/L (5.5 mM). Brines conditioned through the addition of 5.3 g/L sulfamic acid (42.4 mM) resulted in an oxidant solution with no appreciable chloramine odor (i.e. the amount of chloramine was below the odor detection threshold), indicating that a sulfamic acid molar excess of at least 7.7 (42.4/5.5) is required to suppress the formation of dichloramine and trichloramine. Since chloramine odors were detected for the test with sulfamic acid at a concentration of 4.0 g/L (32 mM), it can be assumed that a sulfamic acid molar excess of 5.8 was insufficient to completely prevent dichloramine and trichloramine formation in this water while a molar excess of 7.7 was sufficient to prevent dichloramine and trichloramine formation. Although not measured in this test, conditioning of the waters used in this test with a sulfamic acid concentration of at least 3.9 g/L results in a pH of less than 7 prior to electrolysis and a sulfamic acid concentration of ~8 g/L results in a pH of 2 or less. Prior to conditioning with sulfamic acid, the pH of these waters typically ranged from 7 to 8.

TABLE 14

| Approximate Sulfamic Acid Content of the Produced Water (g/L) | Cell Current (A) | Electrolyzed Solution FAC Content (mg/L) | Electrolyzed Solution TC Content (mg/L) | Electrolyzed Solution pH | Chloramine Odors Detected |
|---|---|---|---|---|---|
| 0    | 40.5 | 1725 | 1775 | 8.02 | Yes    |
| 4.0  | 43.9 | 525  | 1925 | 8.61 | Yes    |
| 5.3  | 51.4 | 375  | 2375 | 8.4  | Absent |
| 6.6  | 43.7 | 300  | 1975 | 6.47 | Absent |
| 7.9  | 51   | 400  | 2300 | 6.11 | Absent |
| 9.2  | 44.8 | 175  | 2200 | 4.3  | Absent |
| 10.6 | 52.7 | 275  | 2475 | 2.26 | Absent |
| 11.9 | 50.5 | 250  | 2600 | 1.78 | Absent |
| 13.2 | 55.5 | 275  | 2575 | 1.6  | Absent |

Example 8

Utilizing an electrolysis system similar to that depicted in FIG. 1, produced waters from oil and gas production operations were electrolyzed with and without the presence of added sulfamic acid. In this test, sulfamic acid and sodium chloride were introduced into the produced water prior to electrolysis through the injection of a solution comprised of ~7.5% by weight sulfamic acid and ~180 g/L sodium chloride. Modified produced waters were then electrolyzed with an applied cell plate-to-plate voltage of 4-5 V, and cell current was recorded during electrolysis. Samples of the electrolyzed solutions were collected and analyzed for FAC content, TC content, and pH. As can be seen increasing the amount of chloride ions clearly resulted in an increased oxidant production, with oxidant TC concentrations increasing from 1325 mg/L at the lowest amount of added sodium chloride up to 2875 mg/L with the highest amount of added sodium chloride. Despite the highly acidic nature of each solution produced under the various conditions tested, no chloramine smell was again detected. Note also that the ammonia measured in this water on the day that this test was conducted determined that the ammonia concentration was 28 mg/L (1.6 mM). As the lowest amount of sulfamic acid added to the brine prior to electrolysis was 6.4 g/L (51.2 mM), the sulfamic acid was present in 32-fold molar excess with regards to ammonia, which is higher than the threshold set with the data in Example 7 to prevent the noticeable formation of dichloramine and trichloramine. Although not measured in this test, conditioning of the waters used in this test with a sulfamic acid concentration of at least 3.9 g/L results in a pH of less than 7 prior to electrolysis and a sulfamic acid concentration of ~8 g/L results in a pH of 2 or less. Prior to conditioning with sulfamic acid, the pH of these waters typically ranged from 7 to 8.

TABLE 15

| Approximate Sulfamic Acid Added to Produced Water (g/L) | Approximate Sodium Chloride Added to Produced Water (g/L) | Electrolyzed Solution FAC Content (mg/L) | Electrolyzed Solution TC Content (mg/L) | Electrolyzed Solution pH |
|---|---|---|---|---|
| 6.4 | 15.4 | 150 | 1325 | 2.92 |
| 12.2 | 29.4 | 225 | 2000 | Not Measured |
| 20.4 | 49.0 | 300 | 2450 | 1 |
| 25.7 | 61.7 | 225 | 2875 | 1 |

Example 8

Scale build up within the electrolytic cell as well as in downstream components was observed while electrolyzing produced waters from oil and gas production operations under various conditions using a system similar to that depicted in FIG. 1. Electrolysis of unmodified produced water for 30 minutes resulted in a valve exposed to the electrolyzed solution downstream of the electrolytic cell becoming difficult to operate, indicating that scales were building up within the valve mechanism. Turning off the electrolytic cell and flushing the electrolysis system with produced water modified with sulfamic acid so that the pH of the modified water was less than 2 resulted substantial carbon dioxide evolution and the valve becoming easy to operate. Both of these observations indicate the removal of scales, specifically carbonate scales which can result in the production of carbon dioxide. An orange discoloration of the water was also observed, indicating the dissolution of iron based scales. Electrolysis of produced water modified with sufficient sulfamic acid such that the pH of the electrolyzed solution was less than 2 for up to 12 hours resulted in no change in the operational ability of the valve downstream of the electrolytic cell. Turning off the electrolytic cell and flushing the electrolysis system with produced water modified with sulfamic acid so that the pH of the modified water was less than 2 resulted modest carbon dioxide evolution. In a later test, the electrolytic cell was opened after operating for 12 hours under conditions where sulfamic acid was used to modify the produce water prior to electrolysis so that the pH of the produced water was reduced to less than 2. The cell was not cleaned after this test, and examination of the cell revealed a substantial amount of scale within the cell, even though no scale build up was detected in downstream components of the electrolysis system. Samples of this material were found to be readily soluble in a diluted sulfamic acid solution. Overall, these results indicate that scales will form within the electrolytic cell despite the presence of highly acidic feed waters and electrolyzed solutions, likely due to the very high pH environment around the cathode, but will not accumulate in electrolysis system components downstream of the electrolytic cell. Since the material inside the cell is soluble in dilute sulfamic acid solution, de-energizing the cell while continuing to flush with sulfamic acid modified produced water will allow for the complete dissolution and removal of scales which will be present inside the electrolytic cell body.

Example 9

Using an electrolysis system similar to that depicted in FIG. 1, brines comprising saturated sodium chloride, ammonium sulfate, and potassium sulfamate were electrolyzed. In all cases, the brines were electrolyzed with a cell plate-to-plate voltage of about 4.3V. The pH of both the brine and the electrolyzed solution, as well as the FAC and TC content of the electrolyzed solution, were measured and recorded in Table 16. Here, when all components were present in the solution, the brines were found to be mildly acidic with a pH between 6 and 7, while the electrolyzed solutions all had pH greater than 11 (i.e. had a high pH). Brines containing 50 g/L potassium sulfamate have a molar sulfamate concentration of 0.37 M, 100 g/L potassium sulfamate have a molar sulfamate concentration of 0.74 M while brines containing 150 g/L potassium sulfamate have a molar sulfamate concentration of 1.11 M. Brines containing 2 g/L ammonium sulfate have a molar ammonium concentration of 0.03 M, brines containing 4.9 g/L ammonium sulfate have a molar ammonium concentration of 0.074 M, and brines containing 19.5 g/L ammonium sulfate have a molar ammonium concentration of 0.295 M. When the sulfamate is present in a molar excess of about 12.3 or greater relative to ammonia in the brine, then sufficient stabilizer is present to prevent the formation of noticeable dichloramine and trichloramine. These species are detectable when the sulfamate is present in a lower molar excess of about 5 relative to ammonia, and extremely notable when the sulfamate is present in an even lower molar excess of about 1.25 relative to ammonia. These results demonstrate that the sufficient molar excess of sulfamate, or other halogen stabilization compound, relative to ammonia to prevent the formation of noticeable amounts of dichloramine and trichloramine is between 5 and 12.3.

Microbe inactivation tests were carried out using solutions prepared according to some of the brine formulations described in Table 16. The solutions produced through the electrolysis of these brines were used to disinfect water containing bacteria. In one example it was found that the solution produced through the electrolysis of saturated sodium chloride brine containing both 100 g/L of added potassium sulfamate and 5 g/L of added ammonium sulfate was up to 100 times more effective at inactivating bacteria than the solution produced through the electrolysis of saturated sodium chloride brine containing only 100 g/L of added potassium sulfamate and no added ammonium sulfate. This improved microbial inactivation efficacy is believed to be due to the presence of monochloramine, since the amounts of dichloramine and trichloramine are below the odor detection threshold.

TABLE 16

| Brine Potassium Sulfamate Concentration (g/L) | Brine Ammonium Sulfate Concentration (g/L) | Brine pH | Oxidant FAC Content (mg/L) | Oxidant TC Content (mg/L) | Oxidant pH | Chloramine Smell |
|---|---|---|---|---|---|---|
| 50 | 0 | 7.23 | 2450 | 4150 | 11.53 | None |
| 50 | 19.5 | 6.38 | 1450 | 2675 | 11.06 | Moderate |
| 50 | 4.9 | 6.71 | 2100 | 3425 | 11.38 | Weak |
| 50 | 2 | 6.9 | 2250 | 3450 | 11.46 | None |
| 100 | 0 | 6.8 | 1050 | 3775 | 11.68 | None |
| 100 | 19.5 | 6.45 | 1000 | 3000 | 11.39 | None |
| 100 | 4.9 | 6.77 | 1175 | 3500 | 11.59 | None |
| 100 | 2 | 6.91 | 1075 | 3600 | 11.68 | None |
| 150 | 0 | 6.9 | 300 | 3875 | 11.75 | None |
| 150 | 19.5 | 6.49 | 375 | 2725 | 11.26 | None |
| 150 | 4.9 | 6.68 | 250 | 3550 | 11.63 | None |
| 150 | 2 | 6.84 | 225 | 3725 | 11.69 | None |

Although the invention has been described in detail with particular reference to the disclosed embodiments, other embodiments can achieve the same results. Variations and modifications of the present invention will be obvious to those skilled in the art and it is intended to cover all such modifications and equivalents. The entire disclosures of all patents and publications cited above are hereby incorporated by reference.

What is claimed is:

1. A method for producing a microbiocidally active solution, the method comprising:
    adding a halogen stabilizing compound and optionally an acid to a brine containing (a) a chloride and (b) ammonia or an ammonium ion containing compound so as to give rise to a stabilized brine having an acidic pH; and
    electrolyzing the stabilized brine in an electrolytic cell, thereby producing a microbiocidally active solution comprising monochloramine and/or a stabilized halogen compound but that does not comprise trichloramine in a concentration above an odor detection threshold, and
    wherein the pH of the microbiocidally active solution is acidic, and wherein the halogen stabilizing compound is present in the stabilized brine at a molar excess of from about 5 to about 12.3 relative to the ammonia or the ammonium ion containing compound.

2. A method for producing a microbiocidally active solution, the method comprising:
    adding a halogen stabilizing compound and optionally an acid to a brine containing (a) a chloride and (b) ammonia or an ammonium ion containing compound so as to give rise to the brine having a pH of between 6 and 8; and
    electrolyzing the brine in an electrolytic cell, thereby producing a microbiocidally active solution comprising monochloramine and/or a stabilized halogen compound but that does not comprise trichloramine in a concentration above an odor detection threshold, and
    wherein the pH of the microbiocidally active solution is greater than 10, and wherein the halogen stabilizing compound is added such that the halogen stabilizing compound is present at a molar excess of from about 5 to about 12.3 relative to the ammonia or the ammonium ion containing compound.

* * * * *